Aug. 19, 1924.
F. W. ROLLER
1,505,497
ELECTRICAL MEASURING INSTRUMENT
Filed Dec. 20, 1920
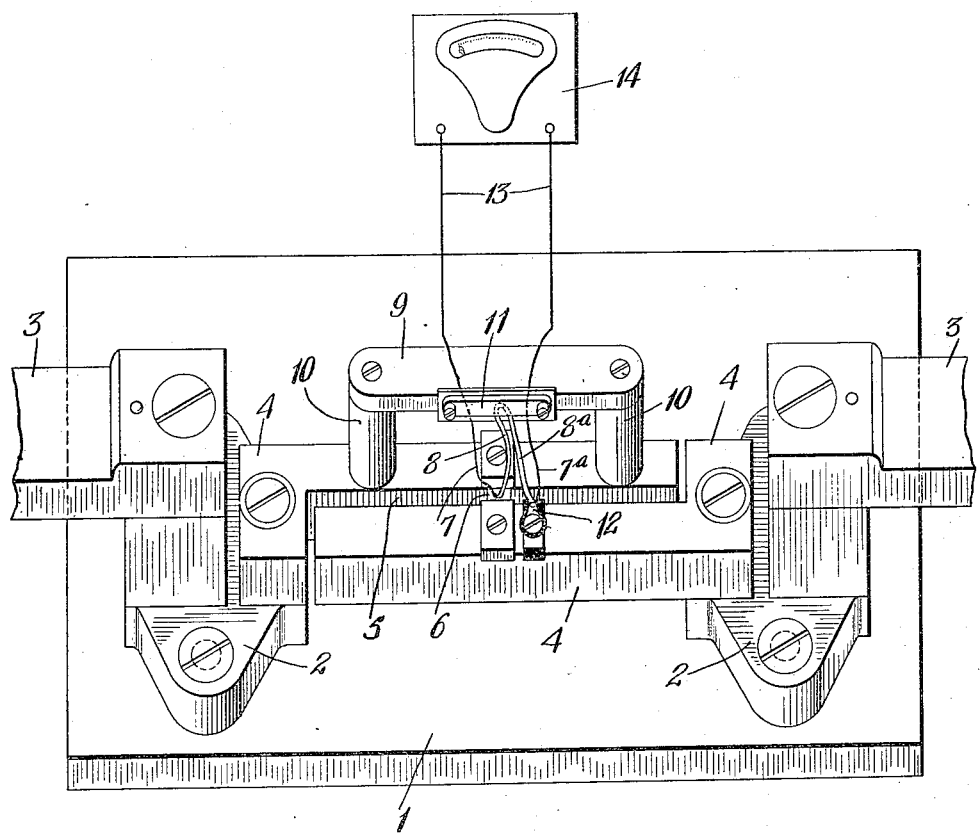
Frank W. Roller Inventor
By his Attorneys
Edwards, Sager & Bower.

Patented Aug. 19, 1924.

1,505,497

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

Application filed December 20, 1920. Serial No. 431,877.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a specification.

This invention relates to instruments for measuring electric currents wherein a conductor or strip is heated by the passage of the current and a thermo-electric couple is utilized for securing an indication of the current to be measured.

The main object of my invention is to provide an instrument of the above type, which is particularly adapted for measuring alternating current of high frequency and to provide compensating means which will insure a high degree of accuracy in the measurement of the current at all times and under all conditions. Another object is to provide an instrument of this character which will be simple in construction and assembly, and thus capable of economical manufacture. Another object is to provide an instrument of this type which will be durable. Other objects and advantages of my invention will be understood from the following description.

The drawing is a perspective view of a preferred embodiment of my invention.

When the hot junction of a thermo-electric couple is applied to a conductor heated in proportion to the strength of the current passing through the conductor, then if the other portions of the couple are maintained at a constant temperature, the electromotive force generated by the couple will be dependent upon the temperature of the point of the heated conductor to which the hot joint of the couple is thermally connected. But the temperature of the heated conductor carrying the current to be measured is not always the same at a given point with the same value of current flowing therethrough, because continued use of the instrument, especially with the larger current values, will cause the temperature of the terminals between which the heated conductor is connected, to increase, due to continued passage of the current. With such conditions, the thermo-couple would indicate a larger value of current than is actually passing through the instrument in case the other portions of the couple remain at a constant temperature. Likewise if the instrument is used for carrying the smaller currents for a considerable length of time the terminals and heated conductor between them will have a lower temperature for the same value of current passing therethrough, than would be the case soon after the passage of larger currents. These and other variable conditions affecting the temperature of the parts will introduce an error in the indication of the current derived from the thermo-couple, unless compensated for by a corresponding modification of the indication derived from the thermo-couple.

By my present invention, I combine an opposing compensating means, such as an opposing thermo-couple, with the thermo-couple in such a manner that the differential effect of the combination automatically compensates for and offsets the errors which would otherwise be introduced. I also provide means whereby the distant portions, or cold ends of the outer elements, of the couples are maintained at a common temperature. This common temperature may change somewhat, but as long as the distant parts of the couples are kept at the same temperature as each other, it suffices to prevent any error arising even though the temperature of these portions as a whole may change somewhat.

Referring to the drawing, an insulating base 1 has secured thereto the two blocks 2, 2, to which the conductors or bars 3, 3 carrying the current to be measured, are secured. Also secured to each of the blocks 2 is an L-shaped block or terminal 4 the blocks being placed in relation to each other so as to overlap, leaving a space 5 between them and also at the ends.

Extending between the terminals 4 and suitably secured thereto, is the hot conductor or hot strip 6, which carries the current to be measured from one terminal to the other and which is heated according to the value of the current passing through the device. At a point, preferably the middle of the strip 6, is located a joint of a thermo-couple in thermal connection therewith, one part of the couple 7 extending from the joint and the other part of this couple of a dissimilar metal 8 also extending from the joint to a supporting part. The support is indicated as a metal plate 9 suitably supported from any convenient portion of the device, such as one of the terminals 4 with intervening supporting posts 10 of hard rubber. The outer portions of the two dissimilar metals 7, 8 of the couple are in intimate thermal connection with the support 9, but electrically insulated therefrom in any suitable manner. A clamp 11 is shown for securing these portions in positions on the metal plate 9.

In series with the couple 7, 8 is another opposing couple $8^a$ and $7^a$; the portion $8^a$ being of the same metal as the portion 8, and the portion $7^a$ being of the same metal as the portion 7; and the two portions 8 and $8^a$ are connected with each other at the supporting plate 9, or obviously the portions 8, $8^a$ may be a continuous length of metal with the distant loop supported at the plate 9. The joint of the couple $8^a$, $7^a$, is thermally connected with one of the terminals 4 but electrically insulated therefrom, in any suitable manner, as by an insulating clamp 12, and the outer portions of this couple are also in intimate thermal connection with the support 9. Leads 13 extend from the free ends of the outer elements 7, $7^a$ of the two serially connected couples located at the plate 9 to a direct current indicating instrument 14 which will indicate the resultant electromotive force generated in the thermo-couple circuit. The indicating instrument may be calibrated and provided with a scale to read directly in the amperes to be measured passing through the main circuit of the apparatus. The device will be provided with a suitable casing or a suitable enclosing and protecting frame, within which the indicating device 14 may also be included.

In operation, the current to be measured passes between the terminals of the device through the hot strip 6, the temperature thereof varying with the change in value of the current. An electromotive force is generated in the couple 7, 8 according to the temperature of its joint located at the hot strip 6. The couple $8^a$, $7^a$ will also generate electromotive force according to the temperature of its joint located at the terminal 4 according to the temperature of the terminal, but this electromotive force will be in opposition to the electromotive force generated by the couple 7, 8. This causes an electromotive force to be impressed upon indicating instrument 14, which is the difference between that generated by the two opposed couples; the instrument 14 thus indicates the net or resultant electromotive force of the complete thermo-electric circuit.

Thus if the heating of the hot strip 6 and of the joint of the thermo-couple 7, 8 is different from the amount representing the true value of the current passing through the hot strip, due to changing temperature of the terminals 4 from any cause, the thermo-couple $8^a$, $7^a$, will generate an electromotive force dependent upon the temperature of the terminal 4 and thus automatically compensate the error which would otherwise arise. For example, if the terminals 4 have become considerably heated and a current is passed through the instrument, the heating of the hot strip and the electromotive force generated in the couple 7, 8, will be higher than would be the case if the terminals were at a lower temperature; but the higher temperature of the terminals causes a corresponding electromotive force to be generated by the couple $8^a$, $7^a$ in opposition to that generated by the couple 7, 8, and correspondingly reduces the latter electromotive force, giving a resultant electromotive force impressed upon the indicating instrument 14, which will correspond with the true value of the current, by reason of this compensation. Furthermore, the ends of the outer elements of the thermo-couples by reason of being maintained at a common temperature by means of their thermal connection through their supporting means, as by the plate 9, no source of error is introduced which would otherwise occur if the temperature of these portions differed; that is even though this common temperature may change somewhat, in course of use of the instrument, the temperature of the distant ends of the outer elements being the same at any given instant, each of the couples is correspondingly affected by the temperature of the distant portions. This will be understood by reason of the fact that the electromotive force of a thermo-couple is dependent upon the difference in temperature between the hot joint and the distant cold portions of the couple, and since the distant or cold portions of the outer elements of the two couples of this instrument always have the same temperature as each other, it results that the electromotive force generated in the complete thermo-electric circuit is dependent solely upon the difference in temperatures between that of the hot strip 6 and a terminal 4.

Any suitable means may be provided for maintaining the distant portions of the couples at a common temperature and in some cases they may be maintained at a common temperature in air without a special support for that purpose.

Instead of using one pair of couples as above described, additional couples may be used properly related and insulated and grouped in series or parallel according to the requirements of any particular case.

My invention may be embodied in various

I claim:—

1. In an electrical measuring instrument, a conductor heated by the passage of current therethrough, and two thermo-couples connected in series with each other and having their electromotive forces opposed to each other, the hot joint of one of said couples being in thermal connection with one portion of said conductor and the hot joint of the other of said couples being in thermal connection with another portion of said conductor having a different temperature from the first named portion, and means for causing the distant ends of the outer elements of the couples to have the same temperature as each other.

2. In an electrical measuring instrument, a conductor heated by the passage of current therethrough, two thermo-couples connected in series with each other and having their electromotive forces opposed to each other, the hot joint of one of said couples being in thermal connection with one portion of said conductor and the hot joint of the other of said couples being in thermal connection with another portion of said conductor having a different temperature from the first named portion, the outer elements of the two couples being of like material, and means for causing the cold ends of the outer elements of said couples to have a common temperature.

3. In an electrical measuring instrument having conducting terminal elements, a conductor connected between said elements and heated by the passage of current therethrough, and a thermo-electric device having the heated joint of one couple in thermal relation with said conductor and having the heated joint of another couple in thermal relation with at least one of said elements, and means for causing the ends of the outer elements of said couples to have the same temperature as each other.

4. In an electrical measuring instrument having conducting terminal elements, a conductor connected between said elements, and heated by the passage of current therethrough, and a thermo-electric device having the joint of one couple in thermal relation with said conductor and having the joint of another couple in thermal relation with at least one of said elements, said couples being connected in series with each other and having their electromotive forces opposed to each other, and the outer elements of said couples being of like material.

5. In an electrical measuring instrument having conducting terminal elements, a conductor connected between said elements and heated by the passage of current therethrough, a thermo-electric device having the joint of one couple in thermal relation with said conductor and having the joint of another couple in thermal relation with at least one of said elements, the outer elements of said couples being of like material, and means for maintaining the distant ends of said outer elements at a common temperature.

FRANK W. ROLLER.